United States Patent
Weiner et al.

(10) Patent No.: US 12,463,983 B2
(45) Date of Patent: Nov. 4, 2025

(54) METHOD AND APPARATUS FOR IDENTIFYING AN INADMISSIBLE MESSAGE OF A MANIPULATED CONTROL DEVICE OF A VEHICLE BY MEANS OF A SECOND CONTROL DEVICE OF THE VEHICLE

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 191 days.

(21) Appl. No.: 18/554,475

(22) PCT Filed: Feb. 15, 2022

(86) PCT No.: PCT/EP2022/053560
§ 371 (c)(1),
(2) Date: Oct. 8, 2023

(87) PCT Pub. No.: WO2022/238025
PCT Pub. Date: Nov. 17, 2022

(65) Prior Publication Data
US 2024/0195814 A1  Jun. 13, 2024

(30) Foreign Application Priority Data

May 11, 2021 (DE) ...................... 10 2021 112 332.1

(51) Int. Cl.
*H04L 9/40* (2022.01)

(52) U.S. Cl.
CPC ........ *H04L 63/126* (2013.01); *H04L 63/1416* (2013.01)

(58) Field of Classification Search
CPC ......................... H04L 63/126; H04L 63/1416
(Continued)

(56) References Cited

U.S. PATENT DOCUMENTS

| 7,409,712 | B1* | 8/2008 | Brooks | ............... | H04L 63/1458 |
| | | | | | 726/13 |
| 2014/0344926 | A1* | 11/2014 | Cunningham | ........ | G06F 21/554 |
| | | | | | 726/22 |

(Continued)

FOREIGN PATENT DOCUMENTS

| DE | 102012224103 A1 | 6/2014 |
| DE | 102013200535 A1 | 7/2014 |

OTHER PUBLICATIONS

International Search Report corresponding to International Patent Application No. PCT/EP2022/053560, dated Jun. 3, 2022 (4 pages).
(Continued)

*Primary Examiner* — Badri Champakesan
(74) *Attorney, Agent, or Firm* — Maginot, Moore & Beck LLP

(57) ABSTRACT

A method for identifying an inadmissible message of a manipulated control device of a vehicle using a second control device includes receiving a first message of a first control device via a first bus system using the second control device, and determining a bus system that is associated with the received first message. If the determined bus system differs from the first bus system, then the received first message is determined to be an inadmissible message of the first bus system by means of the second control device. The method also includes identifying the first control device as the manipulated control device using the second control device if the received first message has been identified as an
(Continued)

inadmissible message. The method further includes providing an alarm message to a vehicle-external server using the second control device if the received first message is an inadmissible message.

17 Claims, 2 Drawing Sheets

(58) Field of Classification Search
USPC .......................................................... 726/22
See application file for complete search history.

(56) References Cited

U.S. PATENT DOCUMENTS

2018/0302422 A1* 10/2018 Kishikawa ............ H04L 9/3271
2021/0021498 A1*  1/2021 Sugashima ........... H04L 63/126

OTHER PUBLICATIONS

Written Opinion corresponding to International Patent Application No. PCT/EP2022/053560, dated Jun. 3, 2022 (7 pages).
German Search Report corresponding to German Patent Application No. 10 2021 112 332.1, dated Jan. 18, 2022. (5 pages).
Anonymous. "Intrusion detection system—Wikipedia" May 2, 2021 (May 2, 2021), Retrieved from the Internet: http://en.wikipedia.org/w/index.php?title=Intrusion_detection_system&oldid=1020956887 [Retrieved on May 25, 2022] XP055924888.

* cited by examiner

METHOD AND APPARATUS FOR IDENTIFYING AN INADMISSIBLE MESSAGE OF A MANIPULATED CONTROL DEVICE OF A VEHICLE BY MEANS OF A SECOND CONTROL DEVICE OF THE VEHICLE

The present application is the U.S. national phase of PCT Application PCT/EP2022/053560 filed on Feb. 15, 2022, which claims priority of German patent application No. 102021112332.1 filed on May which 11, 2021, is incorporated herein by reference in its entirety.

TECHNICAL FIELD

The disclosure relates generally to identifying an inadmissible message of a manipulated control device, and more particularly, to methods, apparatus and computer-readable media therefor.

BACKGROUND

Control devices of vehicles are connected to one another in terms of communication via bus systems. If a control device sends a message without authorization on a bus system, a function of a control device receiving the message can be influenced without authorization. The unauthorized sending of messages by means of a control device on a bus system of a vehicle is currently not checked.

It is therefore the object of the invention to identify in an efficient manner an unauthorized sending of a message on a bus system. In particular, it is an object of the invention to identify in an efficient manner an inadmissible message of a manipulated control device by means of a further control device of the bus system of the vehicle.

SUMMARY

This object is achieved by features and embodiments disclosed and/or claimed herein.

In accordance with one aspect, a method identifies an inadmissible message of a manipulated control device of a vehicle by means of a second control device of the vehicle. The method can be a computer-implemented method or a method implemented by means of a control device. The inadmissible message can be a message of an unauthorized sender of a bus system. The manipulated control device can be a control device that has been connected to the bus system or to the bus systems of the vehicle in addition to an existing control device after the vehicle has been delivered. The vehicle can be a motor vehicle.

The method comprises receiving a first message of a first control device of the vehicle via a first bus system by means of the second control device of the vehicle. The first control device and/or the second control device can be connected to multiple bus systems of the vehicle. It is preferred that the first control device and/or the second control devices can send and/or receive messages via multiple bus systems of the vehicle. A bus system can be a CAN bus. Furthermore, the method comprises determining a bus system, which is associated with the received first message, by means of the second control device. If the determined bus system differs from the first bus system, the method determines the received first message as an inadmissible message of the first bus system by means of the second control device. If the determined bus system differs from the first bus system and if the received first message has been determined as an inadmissible message, the method identifies the first control device as the manipulated control device by means of the second control device, and provides an alarm message to a vehicle-external server by means of the second control device.

Advantageously, the second control device can check whether the received first message has been sent via a bus system that is authorized for the message. Consequently, an inadmissible message can be identified in an efficient manner and the sender of the inadmissible message can be established as a manipulated control device. This enables quick detection of manipulation of control devices across several bus systems.

In accordance with one exemplary embodiment, the second control device can be the only trustworthy source of the message. It is thus possible to identify in an efficient manner an inadmissible sending of a message by means of a manipulated control device.

In accordance with a further advantageous embodiment, the second control device can be connected to at least two bus systems, and/or the first bus system of the at least two bus systems can be a bus system for transmitting diagnostic messages, and/or the second bus system of the at least two bus systems can be a bus system for transmitting application messages. This enables efficient monitoring of inadmissible messages across bus systems by means of the second control device.

In accordance with a further embodiment, the first message can be an application message which is transmitted via the first bus system.

In accordance with still a further embodiment, the method can comprise determining a bus system, which is associated with the received first message, by means of the second control device: determining a message type of the received first message by means of the second control device, determining a second message by means of the second control device of the vehicle, wherein the second message has a message type which corresponds to the determined message type of the first message, determining a bus system which is associated with the determined second message and determining the bus system of the determined second message as the bus system which is associated with the received first message. This renders it possible to determine in an efficient manner the admissible bus system for a received message by means of the second control device.

In accordance with a further embodiment, the second message can be the last successfully transmitted message of the second control device, said message having the message type of the received first message, and/or the second message can be a message for which the second control device is the only trustworthy message source on the bus system which is associated with the second message, and/or the second message can have been sent via a bus system which is associated with the second message prior to receiving the first message from the second control device and the second message can have been stored by means of the second control device following a successful sending of the second message via the bus system which is associated with the second message. This renders it possible to determine in an efficient manner the admissible bus system for a received message by means of the second control device.

In accordance with yet a further embodiment, the alarm message can comprise the manipulated control device and/or the inadmissible message of the first bus system.

In accordance with a further aspect, a computer-readable medium for identifying an inadmissible message of a manipulated control device of a vehicle by means of a second control device of the vehicle includes instructions which, when implemented on a control device of the vehicle, implement the above described method.

A further aspect is characterized by a system for identifying an inadmissible message of a manipulated control device of a vehicle by means of a second control device of the vehicle, wherein the system is designed so as to implement the above described method.

Still a further aspect is characterized by a vehicle comprising the above described system for identifying an inadmissible message of a manipulated control device of the vehicle by means of a second control device of the vehicle.

Further features are disclosed in the claims, the figures and the description of the figures. All the features and feature combinations mentioned above in the description and the features and feature combinations mentioned below in the description of the figures and/or only illustrated in the figures cannot only be used in the respectively mentioned combination but rather can also be used in other combinations or as standalone.

An exemplary embodiment is described below with reference to the attached drawings. Further details, preferred embodiments and developments of the invention are apparent.

DETAILED DESCRIPTION

Figure 1:
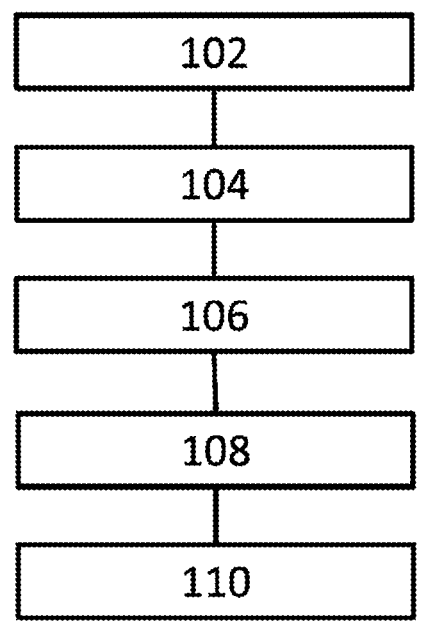
FIG. 1 shows an exemplary method for identifying an inadmissible message of a manipulated control device of a vehicle by means of a second control device of the vehicle.

In detail, FIG. 1 shows an exemplary method 100 for identifying an inadmissible message of a manipulated control device of a vehicle by means of a second control device of the vehicle. Messages on bus systems of a vehicle can be sent from an authorized control device, the second control device, only on a predetermined bus system. The message is inadmissible on any other bus system of the vehicle. By virtue of the fact that the authorized control device of a message, the second control device, monitors all messages on all further bus systems to which the authorized control device is connected, the authorized control device can identify an inadmissible message of a manipulated control device on a different bus system of the vehicle and send an alarm message.

The method 100 can receive 102 a first message of a first control device of the vehicle via a first bus system by means of the second control device of the vehicle. For example, a bus monitoring component which can receive the first message of the first control device can be integrated in the second control device as the authorized sender of the first message. It is preferred that the second control device, in particular the bus monitoring component of the second control device, can receive all the messages which are exchanged via the bus systems to which the second control device is connected. It is preferred that the second control device, in particular the bus monitoring component of the second control device, can receive all the messages which are exchanged via the bus systems to which the second control device is connected and for which the second control device is the authorized sender. The second control device can be the authorized sender for the first message. Consequently, the second control device can receive the first message.

The method 100 can determine 104 a bus system which is associated with the received first message by means of the second control device. If the determined bus system differs from the first bus system, the method 100 can determine 106 the received first message as an inadmissible message of the first bus system by means of the second control device. Furthermore, the method can identify 108 by means of the second control device that the first control device is a manipulated control device if the received first message has been identified as an inadmissible message. Finally, the method 100 can provide 110 an alarm message to a vehicle-external server by means of the second control device. By providing the alarm message to the vehicle-external server, it is possible for a vehicle manufacturer, for example, to be informed about a manipulation of the vehicle.

If the first message is, by way of example, an application message and if this message is received via a diagnostic system, the second control device as the authorized sender of the first message can identify that the application message was transmitted inadmissibly on the diagnostic bus system. A manipulation of the first control device as sender of the inadmissible message is consequently present.

Figure 2:
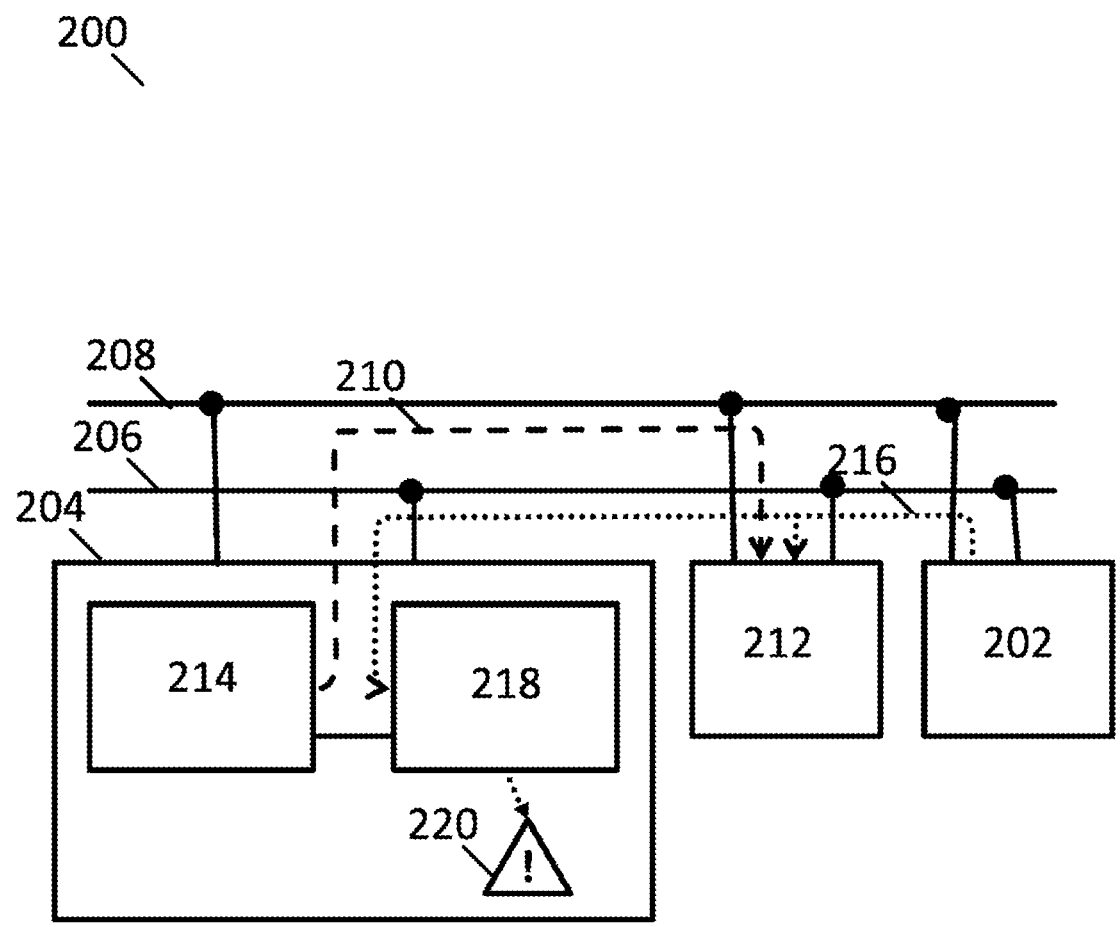
FIG. 2 shows an exemplary method for identifying an inadmissible message of a manipulated control device of a vehicle by means of a second control device of the vehicle.

In detail, FIG. 2 shows an exemplary system 200 for identifying an inadmissible message of a manipulated control device 202 of a vehicle by means of a second control device 204. The manipulated control device 202, also referred to as the first control device, and the second control device are connected to two bus systems 206 and 208. The second control device 204 as the authorized sender of a message 210 having a first message type has transmitted this message via the bus system 208 to a third control device 212. The successful transmission of the message 210 and the associated bus system can be stored by the second control device 204 in a storage device 214.

The second control device 204 can receive a first message 216 via a bus monitoring component 218 from the manipulated control device 202. The first message 216 can have a message type for which the second control device is the authorized sender. The bus monitoring component 218 of the second control device 204 can determine a bus system which is associated with the received first message. For example, the bus monitoring component 218 can query the bus system which is associated with the received first message in the storage device 214 and compare it to the bus system via which the first message was received. If the determined bus system 208 differs from the bus system 206 of the received first message, the bus monitoring component 218 of the second control device 204 can determine the received first message as an inadmissible message of the bus system 206 and can identify the first control device as the manipulated control device 202. It is possible by means of an alarm message 220 for the second control device to provide to a vehicle-external server the inadmissible message and/or the manipulated control device 202.

Advantageously, an inadmissible sending of messages from bus systems can be identified in an efficient manner by means of the authorized sender of the respective message. Manipulations of control devices can thus be detected and/or reported more quickly.

LIST OF REFERENCE SIGNS

100 Method
102 Receiving a first message

104 Determining a bus system
106 Determining the received first message as an inadmissible message
108 Identifying the first control device as the manipulated control device
110 Providing an alarm message
200 System
202 First control device or manipulated control device
204 Second control device
206 Bus system
208 Bus system
210 Message
212 Third control device
214 Storage device
216 First message
218 Bus monitoring component
220 Alarm message

The invention claimed is:

1. A method for identifying an inadmissible message of a manipulated control device of a vehicle using a second control device of the vehicle, the method comprising:
   receiving a first message of a first control device of the vehicle via a first bus system using the second control device of the vehicle;
   determining a bus system, which is associated with the received first message, using the second control device, and
   if the determined bus system differs from the first bus system, then determining the received first message as an inadmissible message of the first bus system by means of the second control device;
   identifying the first control device as the manipulated control device using the second control device if the received first message has been identified as an inadmissible message; and
   providing an alarm message to a vehicle-external server using the second control device if the received first message has been identified as an inadmissible message,
   wherein the second control device is an only trustworthy source of the first message.

2. The method as claimed in claim 1, wherein the second control device can be connected to at least two bus systems.

3. The method as claimed in claim 2, wherein the first bus system of the at least two bus systems comprises a bus system for transmitting diagnostic messages.

4. The method as claimed in claim 3, wherein the second bus system of the at least two bus systems comprises a bus system for transmitting application messages.

5. The method as claimed in claim 2, wherein the second bus system of the at least two bus systems comprises a bus system for transmitting application messages.

6. The method as claimed in claim 2, wherein the alarm message identifies the manipulated control device and/or the inadmissible message of the first bus system.

7. The method as claimed in claim 1, wherein the first message is an application message which is transmitted via the first bus system.

8. A method for identifying an inadmissible message of a manipulated control device of a vehicle using a second control device of the vehicle, the method comprising:
   receiving a first message of a first control device of the vehicle via a first bus system using the second control device of the vehicle;
   determining a bus system, which is associated with the received first message, using the second control device, and
   if the determined bus system differs from the first bus system, then determining the received first message as an inadmissible message of the first bus system by means of the second control device;
   identifying the first control device as the manipulated control device using the second control device if the received first message has been identified as an inadmissible message; and
   providing an alarm message to a vehicle-external server using the second control device if the received first message has been identified as an inadmissible message,
   wherein determining the bus system which is associated with the received first message comprises:
   determining a message type of the received first message using the second control device;
   determining a second message using the second control device of the vehicle, wherein the second message comprises a message type which corresponds to the determined message type of the first message;
   determining a bus system that is associated with the determined second message; and
   determining the bus system of the determined second message as the bus system which is associated with the received first message.

9. The method as claimed in claim 8, wherein the second message is a last successfully sent message of the second control device, said last successfully sent message having the message type of the received first message.

10. The method as claimed in claim 9, wherein the second message is a message for which the second control device is an only trustworthy message source on the bus system which is associated with the second message.

11. The method as claimed in claim 10, wherein the second message has been sent via the bus system which is associated with the second message prior to receiving the first message from the first control device and the second message has been stored using the second control device following a successful sending of the second message via the bus system which is associated with the second message.

12. The method as claimed in claim 9, wherein the second message has been sent via the bus system which is associated with the second message prior to receiving the first message from the first control device and the second message has been stored using the second control device following a successful sending of the second message via the bus system which is associated with the second message.

13. The method as claimed in claim 12, wherein the alarm message identifies the manipulated control device and/or the inadmissible message of the first bus system.

14. The method as claimed in claim 1, wherein the alarm message identifies the manipulated control device and/or the inadmissible message of the first bus system.

15. A non-transitory computer-readable medium for identifying an inadmissible message of a manipulated control device of a vehicle using a second control device of the vehicle, wherein the computer-readable medium comprises instructions which, if implemented on a control device of the vehicle, implement the method as claimed in claim 1.

16. A system for identifying an inadmissible message of a manipulated control device of a vehicle using a second control device of the vehicle, wherein the system is designed so as to implement the method as claimed in claim 1.

17. A vehicle comprising the system for identifying an inadmissible message of a manipulated control device of the vehicle using a second control device of the vehicle as claimed in claim 16.

* * * * *